3 Sheets—Sheet 1.
L. GODDU.
MACHINES FOR INSERTING SCREWS CUT FROM SCREW-THREADED WIRE IN THE MANUFACTURE OF BOOTS AND SHOES.
No. 7,033. Reissued April 4, 1876.
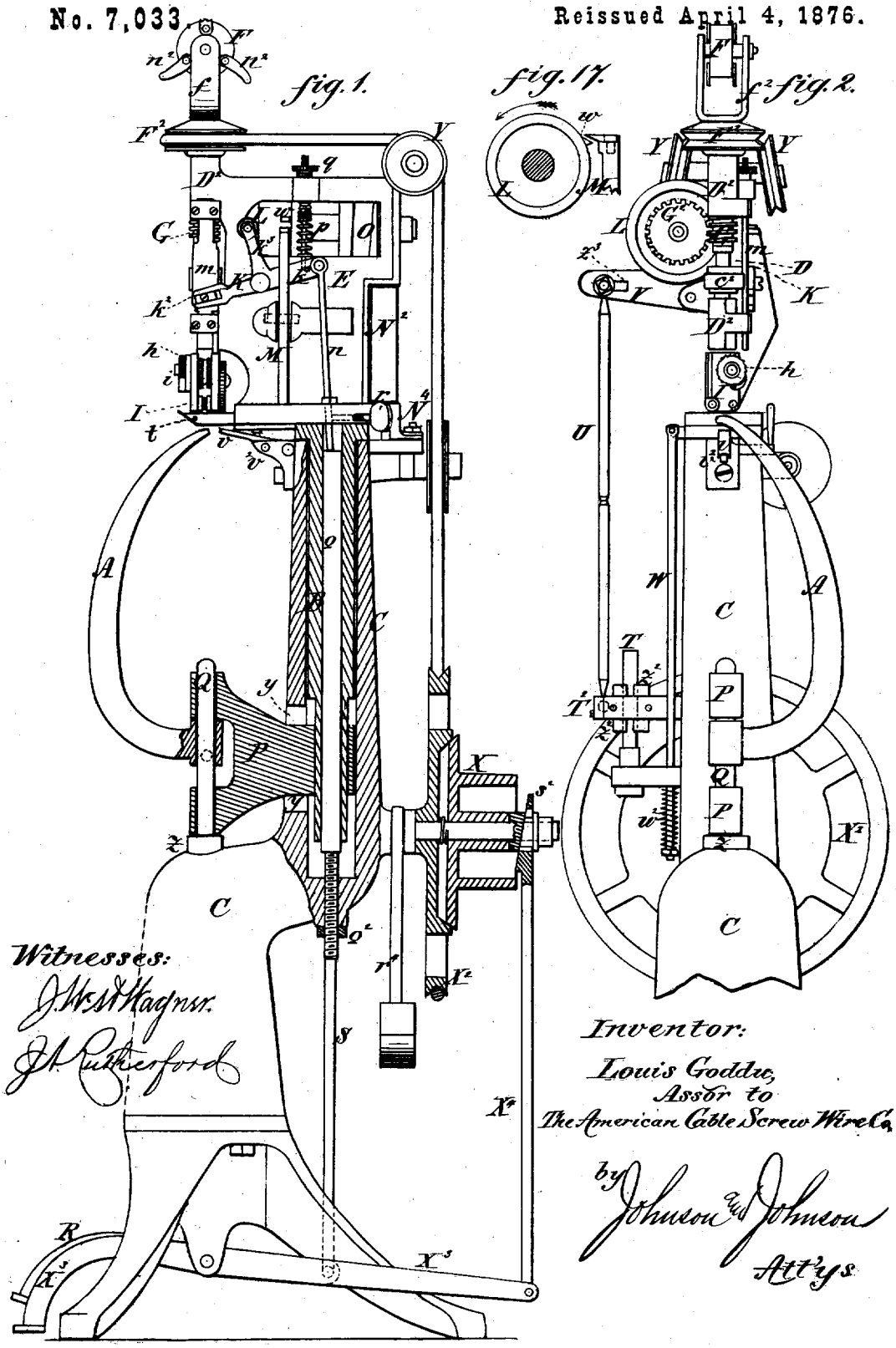
Witnesses:
J. W. M. Wagner
J. A. Rutherford
Inventor:
Louis Goddu,
Assor to
The American Cable Screw Wire Co.
by Johnson & Johnson
Att'ys.
N. PETERS, PHOTO-LITHOGRAPHER, WASHINGTON, D. C.

L. GODDU.
MACHINES FOR INSERTING SCREWS CUT FROM SCREW-THREADED WIRE IN THE MANUFACTURE OF BOOTS AND SHOES.
No. 7,033. Reissued April 4, 1876.
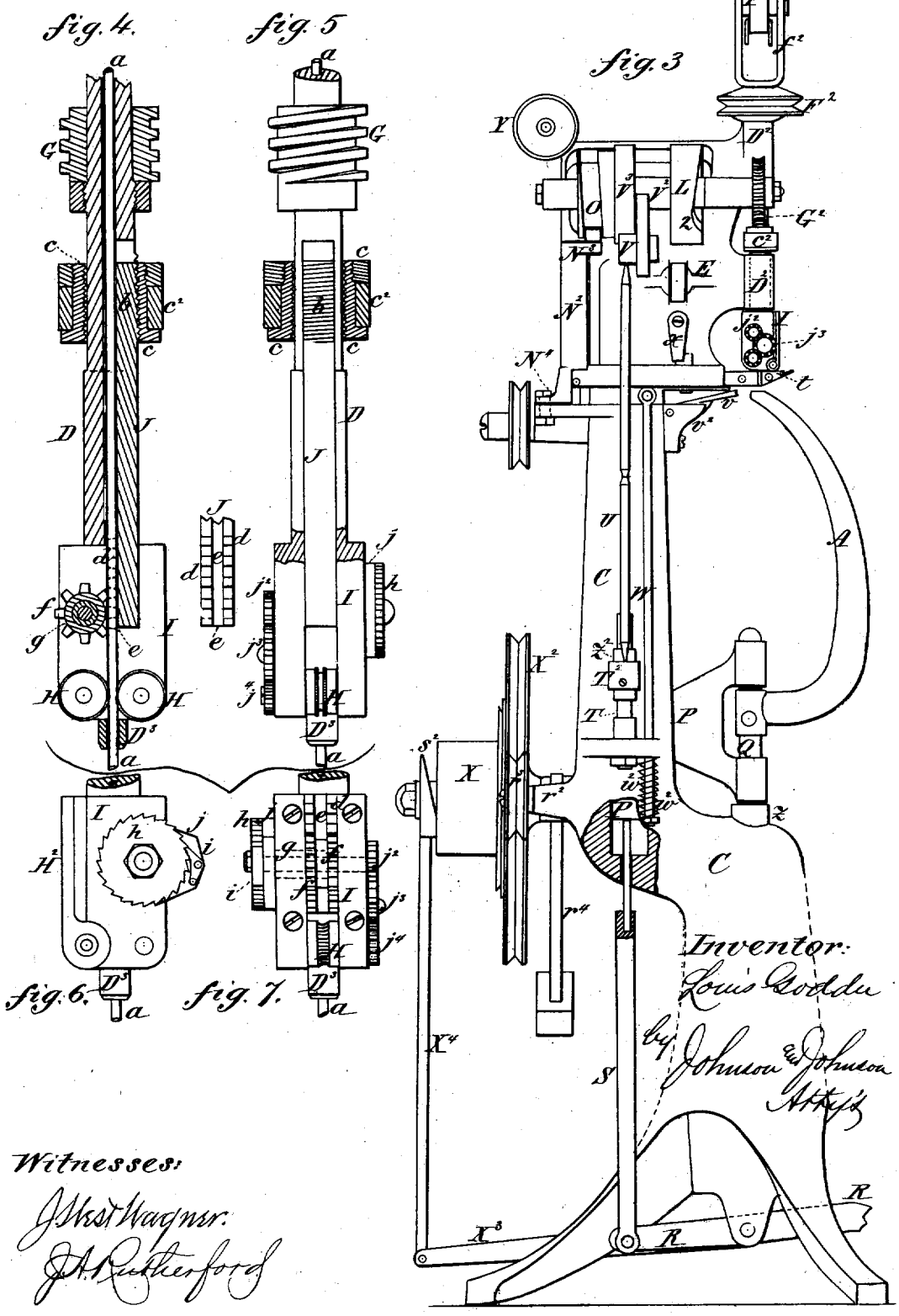
Witnesses:
J. Hirst Wagner.
J. A. Rutherford
Inventor:
Louis Goddu
by Johnson & Johnson
Attys.
N. PETERS, PHOTO-LITHOGRAPHER, WASHINGTON, D. C.

L. GODDU.
MACHINES FOR INSERTING SCREWS CUT FROM SCREW-THREADED WIRE IN THE MANUFACTURE OF BOOTS AND SHOES.
No. 7,033. Reissued April 4, 1876.
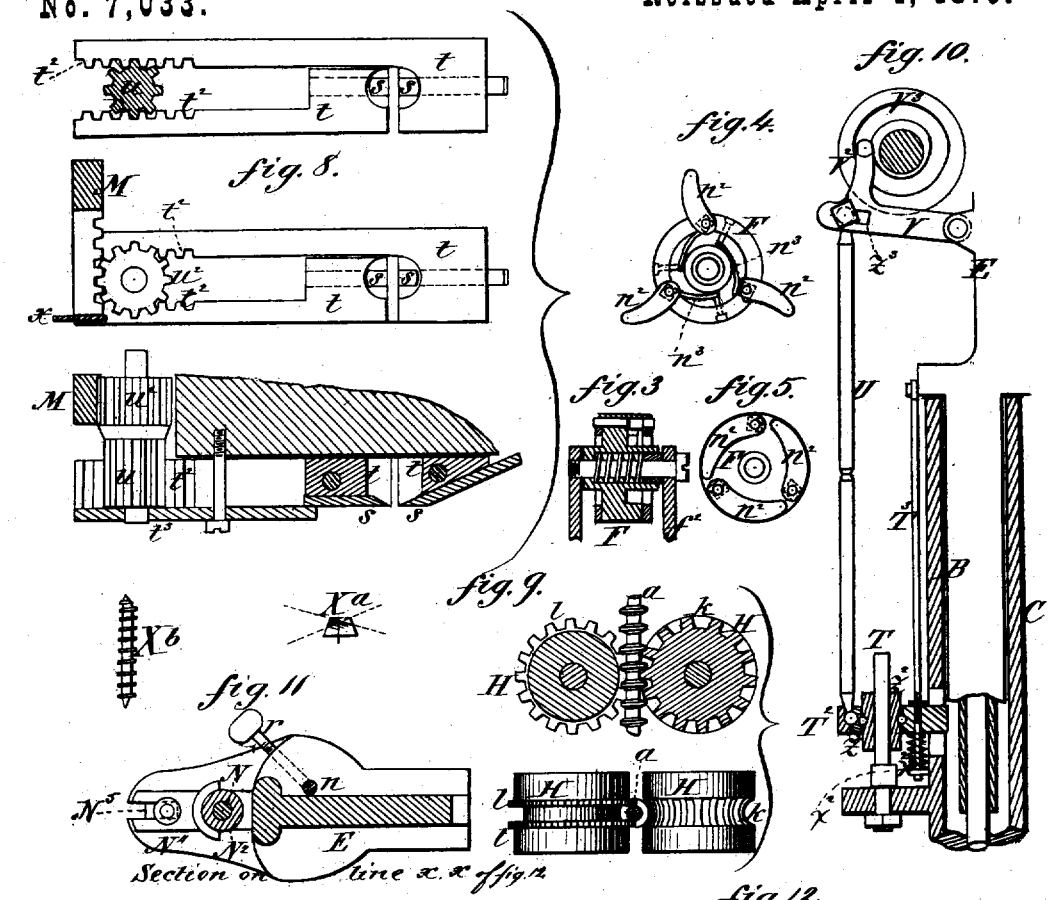
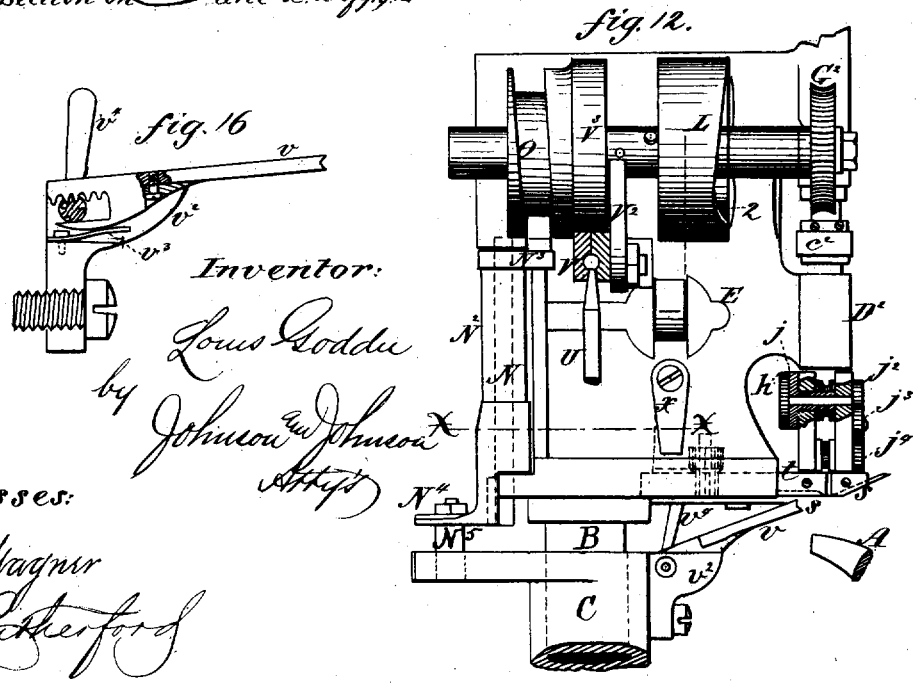
Inventor:
Louis Goddu
by Johnson and Johnson
Attys
Witnesses:
J. West Wagner
J. A. Rutherford
N. PETERS, PHOTO-LITHOGRAPHER, WASHINGTON, D. C.

UNITED STATES PATENT OFFICE.

LOUIS GODDU, OF BOSTON, MASSACHUSETTS, ASSIGNOR TO THE AMERICAN CABLE SCREW WIRE COMPANY, OF SAME PLACE.

IMPROVEMENT IN MACHINES FOR INSERTING SCREWS CUT FROM SCREW-THREADED WIRE IN THE MANUFACTURE OF BOOTS AND SHOES.

Specification forming part of Letters Patent No. 171 610, dated December 28, 1875; reissue No. 7,033, dated April 4, 1876; application filed March 28, 1876.

*To all whom it may concern:*

Be it known that I, LOUIS GODDU, of Boston, in the county of Suffolk and State of Massachusetts, have invented certain new and useful Improvements in Screw-Inserting Machines for Fastening the Soles of Boots and Shoes; and I do hereby declare that the following is a full. clear, and exact description thereof, which will enable others skilled in the art to which it pertains to make and use the same, reference being had to the accompanying drawings, and to the letters of reference marked thereon, which form a part of this specification.

Machines have heretofore been constructed to insert screws to unite the uppers to the soles of boots and shoes by severing such screws from a threaded coil of wire. In such machines the threaded wire has been seized and inserted by a clamping device, which is then released to make the succeeding clamp and feed, and insert the next screw. In such intermittent seizing and clamping device the crushing of the threads of the screw is unavoidable.

It is of great importance and absolutely necessary that the threads of the screw be kept from being crushed by the action of the clamping device in seizing the wire; otherwise, the holding power of the screws would be greatly diminished and rendered uncertain. It is one of the distinguishing aims of my invention to remedy this serious defect, and to produce such a machine in which the work may be rapidly and perfectly done.

In the organization of my new screw-machine I have combined a head carrying the feeding and griping devices for the wire, and having a compound automatic vertical and laterally-reciprocating movement, one of such movements being to adjust itself to different and varying thicknesses of work, and the other to effect the feed of the head over the work. With this last or side reciprocating movement of the head the work-support cooperates, and also moves in unison. The screw is inserted while these parts are moving to the left, and the return movements of the head and the work-support determine the feed by the extent of such movement, the work remaining in its position against an edge-guide, and both the head and the work-support take their positions at another point with respect to the work, ready to insert the succeeding screw. The support for the work, which, in the example shown, is a revoluble horn, is mounted, by means of an arm, upon the stem, which carries and gives the head its compound motion, while the horn-axis has a bearing upon the standard.

The wire-carrying spindle is of novel construction, having a nose projecting between slides which hold the wire-severing knives, and the feed of the wire is effected by a sliding segment of the spindle, having a revolving motion with the spindle, and an automatically varying vertical movement independently of such revolving motion, to alter the length of feed to correspond to the thickness of the stock to be united. This construction of the spindle is not only new, but the means for producing the result stated are also new, and consists in combining with such segment-slide a stop acting on a fixed point in the standard. The head is held from having any vertical movement while the screw is being inserted by means of an automatic locking device, the peculiar construction and operation of which allows it to be used as the means whereby the head is raised as soon as the screw is severed, to give freedom to the head to be turned to the position to insert another screw. The laterally-reciprocating movement of the head is effected by means of a cam operating upon an arm of a coupling or hollow post jointed to the head, and pivoted, by means of a slotted arm, to the standard in the rear of the head.

In the accompanying drawings, Fig. 1 represents a partial sectional elevation of the right side of a screw-inserting machine for uniting the uppers to the soles of boots and shoes; Fig. 2, a front elevation of the same; Fig. 3, an elevation of the left side of the same. In these three views the head is shown in its normal position upon the standard. Fig. 4, a vertical section of the spindle, showing the feeding and holding devices enlarged; Fig.

5, an elevation of the same. Figs. 6 and 7 are views of the lower end of the spindle, showing the geared connection of the slide-segment; Fig. 8, detail views of the severing-knifes and their operating devices; Fig. 9, detail views of the feeding-rolls, being in plan and vertical section; Fig. 10, a sectional view, showing the device for locking the head while inserting the screw; Fig. 11, a horizontal section, showing the hinge of the head from which it receives its laterally-reciprocating movement; Fig. 12, an elevation of the head, showing its relation, when raised, to the standard, the adjustable edge-guide, and the horn; Figs. 13, 14, and 15, details of the pivoted armed spool for the coil of wire; and Fig. 16, a sectional view, showing the adjustable edge-guide.

The work-support A is mounted upon the stem B, Fig. 1, which also carries the head of the machine, and these two elements are mounted upon a standard, C. The spindle D, through which the wire *a* passes, is arranged in line with the axis of the nose of the work-support. It revolves in vertical bearings $D^2$ of the head E, and carries at its upper end the spool F for the coil of wire, and in position to allow it to uncoil in line with the wire passage in the spindle. It is revolved by a pulley, $F^2$, at its upper end, and has a worm-gear, G, which imparts motion to the cam-shaft through a gear-wheel, $G^2$, thereon. (See Fig. 2.) The feed-rolls H are situated within an enlargement, I, of the lower end of the spindle, and the device by which they are operated consists, primarily, of a slide, J, which forms a segment of the spindle, and which has a vertical movement in a groove cut in the spindle. Just above the lower bearing of the spindle the diameter of the latter is reduced slightly, but the arc of the slide remains equal to the greatest diameter of the spindle, and the upper part of this segment has a screw-thread, *b*, on its circumference to receive a threaded sleeve, *c*, upon which a loose collar, $c^2$, is secured by a nut, Figs. 4 and 5. This collar $c^2$ has a vertical movement upon the spindle, and the slide-segment J moves with it, because its screw-threaded portion *b* is of a greater diameter at that point than the spindle, and thus all friction on the spindle is avoided, and a free vertical movement given to the slide-segment. The lower part of this segment J is provided with cogs *d*, having a groove *e*, Fig. 4, at right angles with the cogs through which the wire passes to the griping and feeding rolls H, and is, therefore, in line with the wire passage of the spindle. The feed-rolls are operated by this rack *d* by means of a gear, *f*, having a groove equal to half the diameter of the wire, and which forms, with the groove *e* in the slide-segment J, a continuation of the wire passage of the spindle, and thereby forming a support for the wire while it enters the feed-rolls immediately below. In its upward movement the slide-segment J moves without operating the feed-rolls, because the grooved gear *f* is mounted by a sleeve, *g*, Figs. 4 and 12, upon the shaft, which carries at one end a ratchet-wheel, *h*, into which a pawl, *i*, acts, fastened to the arm *j* of the gear-sleeve *g*, and at the other end said shaft carries a pinion, $j^2$, which, by an intermediate pinion, $j^3$, gears with a pinion, $j^4$, on the end of the feed-roll shaft.

The other feed-roll is made adjustable to give more or less pressure upon the wire, and is held in a bearing-plate, $H^2$, screwed to the head of the spindle.

Now, the operation of this wire-feeding mechanism is as follows, viz: The wire, being fed between the griping and feed rolls H, is held firmly, and caused to revolve with the spindle, the slide-segment J being in its lowest position, and the pawl *i* preventing the rolls from having any backward movement at the time of severing the screw. The slide-segment J, in rising to take a new feed, being connected with the sleeved gear *f*, causes the sleeve-arm *j* and its ratchet-pawl *i* to move backward without turning the ratchet-wheel *h*. This gives the pawl a new bite on the ratchet *h*, when the segment-slide is at its highest point, so that, when brought down, it will cause the ratchet-wheel to turn its geared shaft, which, being connected to the feed-rolls, will turn them, thus feeding down the wire. In this way the slide-segment moves up freely over the wire and down, carrying the wire with it.

The feed-rolls are of peculiar construction, one of which I prefer to construct with an annular concave screw-worm, *k*, Fig. 9, to suit the pitch and size of the screw-thread, and in which the thread embeds itself, so that the pressure needed to hold the wire can be applied by the opposite feed-roll without injuring the thread of the wire, while the other roll, in order to give it the most perfect holding-power, has two annular threaded edges, *l*, with an annular groove between them. This double screw-worm is of the same pitch as that of the other roll, and projects slightly beyond the circumference of the roll, to allow them to enter between the threads and press against the body or core of the wire at two or more separate and distinct points of the circumference of the body of the wire. This is a most important feature, as it gives the required holding-power upon the screw without increasing the pressure to such an extent as would render the feeding difficult. This holding principle gives an intermittent contact, and allows the free passage of wire between them in the direction of its length, holding it firmly, to cause it to revolve with the spindle, and preserving the thread from the least injury. The feed of the wire being effected by the vertical movements of the slide-segment, I obtain this movement by means of a lever, K, having three arms, Fig. 1, and pivoted to the head, one arm, $k^2$, of which is forked, and connected by a pivoted block, working in the fork, to a vertical bar, *m*, moving in ways, and which is connected to the loose collar $c^2$, Figs. 4 and 5, of the slide-segment. Another arm, $k^3$, is connected, by pin and roll, with the cam L, which gives the lever its motion, while the third arm, $k^4$, is connected to a vertical rod, *n*, passing through the base of the head, and which touches and rests upon an adjustable stop, *o*, Fig. 1, inside the hollow stem B, which carries the head each time the length of the feed is determined. This central gage-stop *o* is made adjustable by having a screw on its lower end, passing through a nut in the standard, and provided with a check-nut, $o^2$.

The cam L, Fig. 12, which operates to depress the slide-segment, being a face-cam, if the roll was always allowed to follow the surface of the cam during its revolutions it would raise the slide-segment always to its highest point, and consequently make the same feed. But, if held from following the greatest curve described by the path of the cam L during any portion of its revolution, it is plain that the slide-segment J would not rise so great a distance over the wire, and consequently would not feed down so much wire. The higher, therefore, the slide-segment is raised, the longer will be the screw, and vice versa.

By this construction and combination the operating-cam L is made to perform the function of a series of cams, which would otherwise be required to give the desired elevation to the slide-segment. This is accomplished in the following manner: When the cam L has reached its greatest point of protection it will be seen that, unless some pressure is applied upon the third arm $k^4$, the second arm $k^3$ would not follow the receding curve of the cam, so a spiral spring, *p*, Fig. 1, is arranged to press upon that arm $k^4$ to throw it down. Now, if the vertical rod *n*, leading from the third arm $k^4$, strikes the stop *o* in the base previous to the maximum throw of the cam being reached, it is plain that that will determine the height which the arm operating the slide-segment can rise just as definitely as if the arm $k^3$ had followed and rested upon the face of the cam during its entire revolution. Not only does this spring *p* and stop-rod *n* determine the length of feed for a particular or given thickness of work, but the operation is automatic. The pressure-spring *p* is held in position by a rod rising from the third arm $k^4$, and passing through a sleeve-nut, *q*, in a threaded projection on the head, the spring pressing upon the end of the sleeve-nut, by which the pressure is regulated. The fixed point made by the adjustable standard-stop *o*, and upon which the vertical rod *n* acts, constitutes the base from which this automatic action operates when the head is resting upon the top of the standard. The head of the machine having a vertical movement while the gage-stop *o* remains stationary, it follows that the higher the head of the machine is raised the farther the vertical rod *n* will descend before it touches the stop. Now, if I start with material which requires the head to be raised, say, three-eighths of an inch, to place it upon the work-support, the distance between the gage-stop *o* and the end of the vertical rod *n* will be proportionately increased, and the moment the time comes for determining the length of feed at that point the cam-face L recedes suddenly and allows the compressed spring *p* to force down the vertical rod *n* through the space made by raising the head above the fixed gage-stop *o*, which it strikes, and thereby stops the further ascent of the slide-segment, and thus determines the length of wire fed down, which will correspond with the thickness of the stock. Any point of elevation of the head caused by the thickness of the stock between its contact with the cutter-arms and the work-support will be in like manner determined.

If at any time it is desired to let the machine run and suspend the action of the wire-feeding mechanism, this may be effected by a set-screw, *r*, Figs. 1 and 11, passing through the base of the head in position to be forced against the vertical rod *n*, (which acts upon the fixed stop *o*,) when said rod is at its highest elevation, and keep it from descending, and consequently holding the arm $k^3$ from receiving any motion from the cam L until the rod *n* is unclamped. This gives very great control over the working of the machine without disturbing its other movements.

The screw having been inserted it is necessary to sever it from the wire very quick, and just previous to the head being automatically raised.

The wire-severing cutters *s* are secured each to an arm, *t*, Fig. 8, which is fitted to slide within a groove formed in the under side of the head, and which arms *t* rest upon the work. One is longer than the other, and they are parallel to each other, and provided with cogs $t^2$ on their inner edges at the rear ends, into which a geared pinion, *u*, meshes for imparting opposite sliding movements to these arms, the longest one of which extends in front of a vertical line through the spindle, and the shortest one terminates just back of said line, so that the cutters *s* being fixed with their cutting-edges on opposite sides of this line will approach and recede just half the distance necessary to sever the screw.

In practice, it has been found most desirable to set the cutters so that their cutting-surfaces strike the wire diagonally and at opposite angles, instead of in the same plane or at right angles to the length of the wire. This oblique set is made by beveling the top and under surfaces of the cutters, so that their edges, when brought together, will form an X, as at $X^a$, Sheet 3. The advantages of this are that the knives last longer, cut the wire easier, and form a cutting-edge on the end of the screw, causing it to enter more easily, and the end to rivet on the horn, making a more secure fastening, besides leaving the inside of the shoe perfectly smooth, as shown at $X^b$, Sheet 3. The cutters are held in these arms flush with their under surfaces by set-screws, so as to be adjusted in line with the axis of the spindle, and the arms are held in place by a bottom plate, $t^3$, which also furnishes a bearing for the geared pinion $u$ for operating the slides.

A recess is made in the upper surface of the arms $t$ to receive a cylindrical projection, which forms the nose $D^3$, Figs. 4 and 5, of the spindle D, and by which the wire is supported as near as possible to the stock, to prevent it from bending under the pressure necessary to insert the screw, and bringing the end of the nose $D^3$, the stock, and the cutters nearly in the same horizontal plane, and cutting the wire level with the surface of the stock.

The geared pinion $u$ for the cutter-arms is enlarged at its upper end to form a second pinion, $u^2$, Fig. 8, and has a bearing in the head. In this second pinion meshes the cogged end of a lever, M, Fig. 1, pivoted in the head, and whose upper end is acted upon by a small projection, $w$, on the circumference of the cam L, Fig. 17, which operates the wire-feeding device. The vibration of the upper end of the lever M causes its lower cogged end to traverse back and forth over the pinion $u^2$, turning the latter in alternate opposite directions, and thereby giving the same movement to the cutter-arms. (See Fig. 8.)

It is necessary that the cutting of the wire be done instantly, and for this purpose the projection $w$ is made very steep, and terminates abruptly, so that the cutters may at once open to allow the wire to again pass between them and enter the stock.

To open the cutters instantly after the severing of the wire, a spring, $x$, Figs. 3 and 8, bears upon the geared end of the pivoted lever M, so as to throw it back, and thus cause the pinion $u^2$ to revolve backward to open the cutters, and bring the other end of the lever in position to receive the action of the projection $w$.

I have described the vertical movement of the head, and have stated that in conjunction therewith it has a laterally-reciprocating movement. To obtain this latter movement the head is hinged at its rear by a vertical rod, N, Fig. 11, to a hollow post, $N^2$, provided with an arm at each end, at right angles to each other. This rod N passes through the post and enters a bearing in the head at each end, so that the post rises and falls with the head, and the reciprocating lateral movement is made upon a central supporting-sleeve, B. The post $N^2$ has an oscillating movement caused by its upper arm $N^3$, having a pin and roll connection with a groove-cam, O, on the cam-shaft, while the lower arm $N^4$, Fig. 11, is forked and has an adjustable fulcrum-block, $N^5$, working in a slot in the top of the rear of the standard. Any vibration of the upper arm $N^3$ caused by its cam O necessarily causes the slotted arm $N^4$ to vibrate in the same direction; but this arm, being held by its fulcrum-block $N^5$ from any vibration, it must therefore, turn upon said fulcrum-block as a hinge, but the lower arm $N^4$, being shorter than the other, causes the head to turn on its post-pin N and allow of the vibration of the cam-arm $N^3$ by the hinge-joint connection of the head with the post. A variable lateral movement of the head is effected by moving the fulcrum-block of the lower arm $N^4$ nearer to or farther from the post-pin N, in order thereby to vary the movement of the head over the work to increase or diminish the distance between the screws. The adjustable fulcrum-block is of sufficient length to allow it to perform its function at any elevation of the head above the horn. The post-cam O is of such form as to cause a slow lateral movement of the head to take place to the left, and while the screw is being inserted, and a quicker movement in an opposite direction, to place the head in position over the horn, to insert the next screw.

A new element in the work-support consists in its having a laterally-reciprocating movement with the head, and is carried by the hollow sleeve B, upon which the head is mounted, by means of a forked arm, P, extending from the sleeve, to which it is properly secured, and passes through an opening, $y$, Fig. 1, in the standard. This forked arm P rests and moves upon brace-stud $z$, which gives a support for its horizontal movement, and a pin, Q, passing vertically through the forked ends of this arm, forms the support for the work-support. Upon this pin Q the horn is mounted by a sleeve between the forks of the arm so that it is free to have a rotating movement, while the arm P is allowed to have a vertical movement with the head, without imparting any vertical movement to the work-support, as the play between the ends of the sleeve and the forked arms is equal to the greatest vertical play of the head. Through the sleeve of the horn is a set-screw by which to fasten it to the pin Q at just the proper height. In machines in which a rotating horn has been used it has always been turned upon a fixed center; but in my plan the center upon which the horn revolves is constantly changing in traversing an arc over the base end, yet always maintaining its work-supporting end in line with the spindle, and presenting a hardened imperforate surface in the axial line of its movement to form a resister and riveter for the sole-fastening. The cutter-carrying arms form the pressing-nose, and, when the head is down, press the sole down upon the horn just where the screw is being fed in, and hold the several layers of the material upon a surface which resists solidly the pressure from the screw when arrested by said horn. The solid resting-support for the work to be screwed serves as an anvil on which the screw is received as it is fed in and by which it is clinched.

By this construction it will be seen that the work-support also has a compound movement to carry it back and forth sidewise, to determine the distance between the screws, and perfect freedom to be turned on its axis at the same time. The head is raised, as in Fig. 12, to put the work upon the support, by means of a treadle, R, pivoted to the standard C, and having a vertical rod, S, passing up through the base of the standard, and bearing upon the forked arm P, (see Fig. 3,) where it is connected with the sleeve B supporting the head. In releasing the treadle R, the head E automatically adapts itself to the varying thicknesses of the work.

It is necessary to prevent any vertical movement of the head during the operation of inserting and cutting off the screw, and for this purpose I have devised an automatic locking device, constructed and operated as follows, viz: A pin, T, Fig. 10, rises from a projection on the standard, and is provided with a clamping device consisting of two blocks, $z^2$, pivoted in a carrier, $T^2$, which moves up and down over the pin. The bearing-surfaces of these blocks $z^2$ conform to the shape of the pin T, and are pivoted in the same horizontal line, so that when the carrier $T^2$ is kept horizontal these blocks $z^2$ will move easily vertically over the pin. The inner end of this carrier $T^2$ is fitted to move in a slot in the standard, and by which it is held from moving sidewise. This carrier $T^2$ is supported at its inner end by a rod, $T^3$, the upper end of which is connected to the base of the head, while the lower end passes some distance through the carrier, and has a spiral spring, $x^2$, upon which the inner end of the carrier rests, with a nut resting upon the carrier, so as to keep it level when the head descends. The outer end of the carrier is attached by a ball-and-socket joint to one end of a vertical rod, U, having a screw-extension, its other end being connected by a similar joint to the slotted end of an arm, V, pivoted to the head, with a branch, $V^2$, connecting it with a groove-cam, $V^3$.

Now, so long as the carrier $T^2$ is kept in a horizontal position no clamping-pressure of the blocks $z^2$ is applied upon the pin T; but so soon as one end is lowered the carrier becomes oblique to the positions of the blocks, and hence the blocks will be caused to bear, by reason of their pivots, upon the opposite sides of the pin T; and it is plain that any lifting upon the raised end of the carrier must tend to clamp the pin more firmly. Just previous to the screw touching the stock the cam $V^3$ has raised the vertical rod U, and with it the outer end of the carrier $T^2$, thus clamping the pin. The rod U, which has tilted the carrier, being connected to the head, any receding of the head from the work would carry the rod U also higher, but which is prevented from so moving by reason of the carrier refusing to slide over the pin T, so that the greater the force exerted to raise the head the more firm will be the grasp of the clamping device, thus making the head as rigid as if it had no vertical movement during the operation of inserting the screw.

In order to get the head back over the work, to insert another screw, it must be raised from the stock, and consequently the lock must be taken off; and this is done by the cam $V^3$ forcing down the connecting-rod U, and depressing the outer end of the carrier $T^2$, and applying the lock in the opposite direction; but this does not raise the head, but the rod U being prevented from any greater descent by the clamp $T^2$, and the cam $V^3$ having a still farther throw, exerts its force upon the arm V, pivoted to the head; therefore the head must rise, as all the force of the cam $V^3$ is transferred to elevate the pivoted end of the arm V, connected with said head; but the lock still remaining, some provision must be made for such movement of the head without disturbing the lock. This provision is made by the rod $T^3$ connecting the head E with the inner end of the carrier $T^2$, Fig. 10, which at this moment is the highest, and the elevation of the head carries up this rod with it by compressing the spiral spring $x^2$, which bears against the lower side of the inner end of the carrier, and this elevation of the head is preserved during part of its movement to the right over the work, when the cam $V^3$ again allows the head to drop down suddenly upon the work and compress the parts tightly together, the clamp having been relieved from the pin T just previously to automatically determining the feed of the wire, and locking the head to insert another screw.

In uniting very thick work, an auxiliary pressure of the head upon the work is obtained by a rod, W, united to the head and passing through an arm of the standard, with a spiral spring, $w^2$, Fig. 3, exerting a constant downward force upon the head, and which may be relieved when desired.

The locking device is automatic as regards time, and also works irrespective of the relative height of the head above the horn, and holds the head equally for all thicknesses of work.

The height to which the head may be raised is regulated by adjusting the ball-and-socket connection in the slot $z^3$, Fig. 10, of the pivoted arm V, nearer to or farther from the head E, to suit the thickness of the work to be screwed together. This is important, because more elevation is needed when there is considerable difference in the thickness of the same sole than with a sole of comparative uniform thickness.

Hitherto the work has been moved over the horn in being fed, but in this machine the work is held stationary, while the support and the head move over the work, bringing them in a new position on the sole. In this plan the work is held by a self-adjusting edge-guide, $v$, Fig. 16, fitted in a bracket, $v^2$, and extending beneath the cutter-arms $t$. The point which acts on the edge of the sole is roughened to hold the shoe, with slight pressure, from moving back with the head when taking a new feed. Its seizing end is kept up close to the arms which carry the cutters by a spring, $v^3$, acting on its under side so that it will always strike the edge of the sole at whatever height the head may be. It is adjustable lengthwise by cogged connection with a hand-lever, $v^4$, so as to determine the distance of the screws from the edge of sole.

To control the speed of the machine, I imploy a friction-pulley, X, which connects with the driving-pulley $X^2$, Fig. 1, and is operated to apply and release the friction thereon by a treadle, $X^3$, a connecting-rod, $X^4$, from which forces a wedge, $s^2$, against the friction-pulley.

This driving-pulley is arranged at the back of the standard, and the band therefrom passes over two loose pulleys, Y, at right angles from the spindle-pulley $F^2$, and as these pulleys rise and fall with the head, I compensate for the slack in the driving-belt by means of a take-up follower pivoted to the axis of the driving-pulley and one arm, $r^2$, of which has a loose pulley, $r^3$, Fig. 3, bearing against the belt, and the other arm, $r^4$, is weighted to cause this pulley to bear against the belt, receding as the belt becomes taut, and following it as it slackens, and thereby giving uniform driving-power to the belt.

The spool F, Figs. 13, 14, and 15, for receiving the coil of wire, is mounted in a frame, $f^2$, which is screwed upon the top end of the spindle. It is provided with curved fingers $n^2$ pivoted to the sides of the spool, so as to be folded therewith within the circumference to allow the coil to be placed upon the spool, and held thereon by turning the fingers $n^2$ out, in which positions they are held by springs $n^3$ acting upon angular portions of their bearings. An interior spring gives the spool the necessary friction.

Operation of the machine: The machine having been set in motion, and the wire *a* fed through the spindle D, and between the feed-rolls H, with the head E pressing upon the stock and the segment-slide J in its elevated position, the spindle, revolving, gripes and turns the screw threaded wire with it. The head is now locked upon the pin T by the cam $V^3$ elevating the outer end of the lock-carrier $T^2$, so as to prevent the least ascent of the head. The slide-segment J is now caused to descend by the action of its cam L to feed down the wire as fast as it enters the work. At this moment the head commences its lateral movement to the left, caused by the cam O operating the arm $N^3$ of the hollow post $N^2$, and said head turning upon its hollow post carrying the work, with its support, in its proper supporting position, with its armed support P resting upon the base-stud Z, and preserving at all points its axial line of support, and upon which it may be rotated. At this point the cam L, operating the slide-segment J, has forced it down, operating the feed-rolls H, and inserting the screw. The screw, having thus been inserted, must be severed from the main length. This is done by the stud-cam *w* striking the end of the pivoted arm M, causing its cogged end to revolve its geared pinion $u^2$, so as to cause the ends of the cutter-arms *t* to approach each other and close the cutters *s*, severing the wire, after which the cutters open quickly by the action of the pressure-spring *x*, forcing back the cogged end of the lever M, and thereby reversing the motion of the pinion *u*, opening the cutters, the upper end of the lever pressing upon the surface of the cam-cylinder L in readiness to be again operated by the stud-cam *w*. As soon as the screw is inserted the cam $V^3$ begins to force connecting-rod U down, releasing the lock; but, continuing in the same direction, causes the clamp-carrier $T^2$ to lock on the pin T in the opposite direction, the outer end of the clamp-carrier being now the lowest.

The further revolution of the cam $V^3$, still pressing upon the rod U, which can descend no farther, causes the pivoted end of the cam-arm V to rise and elevate thereby the head, to release it from the stock. Now, the head being lifted clear of the stock, the cam O, which operates the hollow post $N^2$ by its arms $N^3$ and $N^4$, now reverses the lateral movement of the head, bringing it, with the work-support, to the right. The work, being during this time pressed against the edge-guide *v*, does not move from the position to which it was carried to the left; hence it is retained in position for the insertion of the next screw. Just previous to completing the movement of the head to the right the cam $N^3$ has elevated the rod U, bringing the clamp-carrier level and relieving the lock, when a sharp curve in the cam allows the head and the rod to descend equally without making the lock, and thereby pressing the layers of the work compactly together, so as to determine definitely the amount of wire needed for the next screw. Just at this point the cam L, which operates the segment-slide, recedes by a sharp curve, 2, and allows the pressure-spring *p* to force down the third arm $k^4$, and with it the vertical rod *n*, until it strikes upon the stop-gage *o* at whatever height the head may be, and, by this means, arresting the ascent of the slide-segment J at this point, and holding it there until the cam L again acts upon the second arm $k^3$, to force down again the slide-segment J, and bring up the vertical rod *n* in position to again set the feed at whatever height the head may be above the work-support. In this way the screw-wire is fed automatically, and varying lengths of screws may be inserted each revolution of the cam, severing a screw from the main length of wire (after the fastening is inserted) flush with the surface of the work the moment the screw touches the work-support, the time between inserting a long screw and a short one being the same, and the feed of the wire taking place while the fastening is being inserted. To remove work from and place it upon its support the operat- or has only to place his foot upon the treadle and raise the head.

I have given a specific description of the several operating devices of the machine; but as my invention comprehends a broader principle than mere construction, I do not therefore wish to be confined to the specific details described, but to vary the same so long as the essential combinations and results stated are obtained. Nor do I wish to be confined to the manufacture of boots and shoes, as the machine is well adapted for uniting the seams of hose, belting, and other similar work; and although the horn has its advantages as a work-support, yet I do not wish to be confined to such device, but to use any proper work-support which will answer the purpose in properly presenting the work.

What is claimed in this invention for uniting the soles to the uppers of boots and shoes is—

1. In a machine for uniting the uppers to the soles of boots and shoes by screws severed from a continuous wire, an automatic laterally-reciprocating head, carrying the screw feeding, holding, inserting, and screw-severing mechanism, to determine the distance between the screws during the operation of inserting each into the stock.

2. In a machine for uniting the uppers to the soles of boots and shoes by screws cut from a continuous wire, a revoluble work-support, having an automatic laterally-reciprocating movement to carry the work the distance between each screw while the latter is being inserted.

3. In a machine for uniting the uppers to the soles of boots and shoes, the combination, with mechanism for feeding, holding, and inserting screws and severing them from a continuous wire, of a work-supporting horn, having a compound rotating and automatic laterally-reciprocating movement.

4. The combination, in a machine which inserts and cuts screws from a continuous wire, of a rotating work support and resister, having a compound rotating and automatic laterally-reciprocating movement, with a head carrying the feeding, holding, and screw-severing mechanism, and having an automatic vertical and lateral movement.

5. The combination, in a machine for uniting the uppers to the soles of boots and shoes by screws cut from a continuous wire, of an automatically-vertical adjusting head, E, with a rotating work-support, A, having an automatic lateral movement, and in which the vertical movement of the head is independent of the work-support, substantially as herein set forth.

6. The combination of mechanism by which screws are cut from a continuous wire and inserted in the stock of a head, and a work-support having a simultaneous and equal automatic laterally-reciprocating movement.

7. The combination of a head, which carries mechanism adapted to insert various lengths of screws cut from a continuous length of wire, with a work-support free to rotate on its axis at any point in its lateral movements with the head, substantially as herein set forth.

8. The combination, with a rotative work-support, of an unintermittent griping device for the screw-threaded wire, whereby said device has a continous grasp upon the threaded wire during the operation of the machine.

9. In a screw-inserting machine, a continuous corrugated or screw-threaded raceway revolving with the spindle, whereby an unintermittent grip is maintained on the wire, causing it to turn with the spindle, while allowing the wire to pass through the raceway into the work, when the wire-feeding mechanism gives it motion.

10. The combination, with a work-support, of a revolving wire-carrying spindle, D, having both a lateral and a vertical movement with and equal to that of the head.

11. The combination, with a work-support, of a revolving wire-carrying spindle, D, and an automatically-regulated slide segment, J, for operating the unintermittent pressing and griping device revolving with the spindle.

12. The combination, with the wire-carrying spindle D, of feeding and griping rolls H, having annular screw-threaded recesses and projections *k l* corresponding with the threads of the wire for receiving the same, and allowing the wire to pass between them in the direction of its length, so that pressure may be applied to grasp and feed the wire without injuring its threads.

13. A pair of rolls for seizing and feeding screw-threaded wire, one or both of which has annular-projecting screw-threaded edges *l l* adapted to the threads of the wire, and into which they enter while the wire is clamped between the rolls, whereby pressure is made upon the core or body of the wire at two or more separate and distinct points.

14. The combination, with the wire-carrying spindle D and its automatically-operating cogged slide-segment J, with its annular-grooved geared pinions *f*, the pawl *i*, and the ratchet *h*, whereby the descent of the slide-segment causes the feed-rolls to revolve and feed the wire, while allowing the said slide-segment to move upward without giving motion to the feed-rolls.

15. The combination, with the revolving wire-carrying spindle D, of feeding and griping rolls H, constructed substantially as herein described, for feeding screw-threaded wire, with a rotating work-supporting horn, having a riveting-surface.

16. A revolving wire-carrying spindle, D, provided with a nose, $D^3$, in combination with the cutter-supporting arms *t*, between which it enters, and the work-supporting horn, whereby the wire is supported at the point of the severance of the screw therefrom.

17. In combination with an automatic vertically-adjusting head, E, carrying the feeding, inserting, and severing devices, and a work-support, of an automatic vertically-adjusting edge-guide, *v*, for the work, substantially as herein set forth.

18. In combination with an automatic vertically-adjusting head, E, carrying the feeding, inserting, and wire-severing devices, of an edge-guide, *v*, for the work, having an automatic vertical adjustment and an adjustment at right angles to the feed of the work, substantially as and for the purpose herein set forth.

19. The combination, with the revolving wire-carrying spindle D, and an automatically-adjusting head, E, of a wire-coil-carrying reel, F, carried by said head, and revolving with the spindle to deliver the wire thereto.

20. The wire-coil-carrying reel F, provided with pivoted curved fingers $n^2$, whereby they may be folded to put on the coil and turned outward to hold it in place.

21. The combination, with a revolving wire-carrying spindle, having an automatically-operating slide-segment, J, revolving therewith to operate the feeding and griping devices, and a work-support, of means for automatically determining the proper feed of the wire for the varying thicknesses of the work by governing the movement of said slide-segment.

22. The combination, with a wire-carrying spindle, having a slide, J, revolving therewith for operating the feeding and griping devices, of the vertical rod *n*, gage-stop *o*, lever K, operated by a cam, L, and a spring, *p*, acting upon said lever, whereby the relative height of the head above the stop, when the stock is compressed, automatically determines the feed of the wire.

23. The combination, with the revolving spindle D, of means for throwing out of action the feeding mechanism, without arresting the revolving motion of the spindle, and without releasing the grasp of the feed-rolls upon the wire.

24. In a machine for inserting screws in the manufacture of boots and shoes, the combination, with an automatic vertically-adjusting head, and a work-support, of means for automatically locking the head at any point corresponding to the thickness of the work while inserting the screw.

25. In a machine for inserting screws in the manufacture of boots and shoes, the combination, with an automatic vertically-adjusting head, E, a revolving wire-carrying spindle, and a work-support, of means for automatically raising the head a definite height from the work, whether thick or thin, substantially as herein described.

26. In a machine for inserting screws cut from a continuous wire in the manufacture of boots and shoes, the combination, with an automatic vertically-adjusting head, E, and a work-support, of an automatic locking device, which constitutes the medium through which the head is alternately raised and kept from being raised.

27. The combination, in a machine for inserting screws in the manufacture of boots and shoes, of a locking device, one end of which is attached to the head E, and the other end connected to a lever, V, operated by the cam $V^3$, whereby the locking device is brought in and out of action.

28. The combination, in a machine for inserting screws in the manufacture of boots and shoes, of a locking device for the head, and a rod, $T^3$, connecting such device with the head, and having a yielding connection with the locking device, whereby the head is allowed to rise when the locking device is in force.

29. The locking device, consisting of a fixed pin, T, pivoted clamping-blocks $z^2$, and a movable carrier, $T^2$, operating to clamp the pin T, by the depression or elevation of either end of the clamp-carrier by the action of the operating cam $V^3$, as described.

30. The combination with a work-support and the locking device for the head, of an adjustable lever, $V\ V^2\ z^3$, whereby the head is caused to be lifted more or less from the work-support, as described.

31. The combination, with the work-support and the vertically-movable head E, of an auxiliary yielding rod, W, connecting the head with the standard, to increase the pressure of the head upon the stock to bring the work close together, substantially as herein set forth.

32. A revolving wire-carrying spindle with its feeding and unintermittent griping-rolls, and a vertically-moving slide-segment, J, for feeding screw-threaded wire, in combination with the worm G, operating the cam-shaft by the direct revolving motion of the spindle.

33. The combination, in a machine for inserting screws cut from a continuous wire, in the manufacture of boots and shoes, of a treadle, R, for lifting the head E, with the automatic laterally-moving work-support, to place and remove the work.

34. The combination, in a machine for inserting screws cut from a continuous length of wire in the manufacture of boots and shoes, of a friction device operated by a treadle, X, with the vertically-adjustable head, substantially as described, for controlling the speed of the machine.

35. The combination, in a screw-inserting machine, of a vertically-adjusting head, which carries the driving-pulley for the spindle, and a driving-pulley, $X^2$, carried by the standard, with a take-up follower for making uniform the driving-power of the belt during the vertical movement of the head.

36. In a machine for inserting screws in the soles of boots and shoes, cut from continuous screw-threaded wire, the combination of the following instrumentalities, viz: a revolving wire-carrying spindle, having the automatic feed device, the unintermitting operating screw-threaded griping-rolls for holding screw-threaded wire while being fed, a device for severing the wire close to the work, a work-support and riveter for the fastening, and an edge-guide for the sole, which rises and falls with the wire-severing device, substantially as herein set forth.

37. The combination, with a vertically-adjusting head, in a machine for inserting screws cut from a continuous length of screw-wire, of a bracket, P, secured to the head stem and furnishing a pivot-support, Q, for the work-support, such bracket having freedom for vertical movement with the head over the pivot-pin Q, and without disturbing the function of the work-support, as herein set forth.

38. In a machine for inserting screws in the soles of boots and shoes to unite them to the uppers, the combination of a revolving wire-carrying spindle, unintermittent griping-rolls, a wire-feeding mechanism, and a work-support, with cutters having their cutting-edges approaching in oblique lines, whereby the wire is severed with a cutting-edge on the entering end of each screw.

39. The head E operated by suitable mechanism to have a slow side movement while inserting the screw, and a quick return into position to insert the next screw into the work, the latter moving only during the operation of inserting the screw, but is without movement during such return of the head.

40. The head and the work-support, adjustable to vary their laterally-reciprocating movements, whereby to increase or diminish the distance between the screws.

41. The combination of the automatically laterally-moving head E, and the fixed standard C, with the oscillating post $N^2$ and its fulcrum-block $N^5$, for the purpose set forth.

In testimony whereof, I have affixed my signature in the presence of two witnesses.

LOUIS GODDU.

Witnesses:
A. W. ADAMS,
N. S. HOTCHKISS.